US012724821B2

(12) United States Patent
Tian

(10) Patent No.: US 12,724,821 B2
(45) Date of Patent: Sep. 1, 2026

(54) METHOD, APPARATUS, ELECTRONIC DEVICE AND READABLE MEDIUM FOR PRESENTING

(71) Applicant: Beijing Zitiao Network Technology Co., Ltd., Beijing (CN)

(72) Inventor: Jiyuan Tian, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/703,226

(22) PCT Filed: Sep. 23, 2022

(86) PCT No.: PCT/CN2022/120739
§ 371 (c)(1),
(2) Date: Apr. 19, 2024

(87) PCT Pub. No.: WO2023/065963
PCT Pub. Date: Apr. 27, 2023

(65) Prior Publication Data

US 2024/0419723 A1 Dec. 19, 2024

(30) Foreign Application Priority Data

Oct. 19, 2021 (CN) ........................ 202111217427.3

(51) Int. Cl.
*G06F 16/538* (2019.01)
*G06F 16/532* (2019.01)
(Continued)

(52) U.S. Cl.
CPC .......... *G06F 16/538* (2019.01); *G06F 16/532* (2019.01); *G06T 7/11* (2017.01);
(Continued)

(58) Field of Classification Search
CPC ...... G06F 16/538; G06F 16/532; G06F 18/00; G06F 3/01; G06T 7/11; G06T 7/20;
(Continued)

(56) References Cited

U.S. PATENT DOCUMENTS

| | | | | |
|---|---|---|---|---|
| 8,854,486 | B2 * | 10/2014 | Tian | H04N 19/70 348/47 |
| 11,640,698 | B2 * | 5/2023 | Li | G06V 20/35 345/633 |

(Continued)

FOREIGN PATENT DOCUMENTS

| | | |
|---|---|---|
| CN | 103034323 A | 4/2013 |
| CN | 103823554 A | 5/2014 |

(Continued)

OTHER PUBLICATIONS

Office action received from Chinese patent application No. 202111217427.3 mailed on Jun. 6, 2025, 15 pages (7 pages English Translation and 8 pages Original Copy).

(Continued)

*Primary Examiner* — Angelica Ruiz

(57) ABSTRACT

A method, apparatus, electronic device, and storage medium for presenting is provided. The method includes: determining operation information of a user from a video, the operation information comprising a motion trajectory of a hand of the user in the video (S110); generating a profile of an object based on the motion trajectory (S120); searching for corresponding information that matches the profile in a database (S130); presenting an image based on the corresponding information (S140).

18 Claims, 5 Drawing Sheets

(51) Int. Cl.

| | |
|---|---|
| ***G06T 7/11*** | (2017.01) |
| ***G06T 7/20*** | (2017.01) |
| ***G06T 11/00*** | (2026.01) |
| ***G06V 10/764*** | (2022.01) |
| ***G06V 40/10*** | (2022.01) |
| ***G06V 40/20*** | (2022.01) |
| ***G10L 15/04*** | (2013.01) |
| ***G10L 15/08*** | (2006.01) |

(52) U.S. Cl.

CPC ................ *G06T 7/20* (2013.01); *G06T 11/00* (2013.01); *G06V 10/764* (2022.01); *G06V 40/11* (2022.01); *G06V 40/28* (2022.01); *G10L 15/04* (2013.01); *G10L 15/08* (2013.01); *G10L 2015/088* (2013.01)

(58) Field of Classification Search

CPC ...... G06T 11/00; G06V 10/764; G06V 40/11; G06V 40/28; G06V 20/20; G06V 20/41; G06V 40/20; G06V 10/82; G10L 15/04; G10L 15/08; G10L 2015/088; G06N 3/045; G06N 3/0475; G06N 3/094

See application file for complete search history.

(56) References Cited

U.S. PATENT DOCUMENTS

| | | | | |
|---|---|---|---|---|
| 2010/0199232 | A1* | 8/2010 | Mistry | G06F 3/0426 715/863 |
| 2010/0235285 | A1* | 9/2010 | Hoffberg | G06Q 50/188 705/37 |
| 2010/0317420 | A1* | 12/2010 | Hoffberg | G06Q 30/0282 463/1 |
| 2014/0177909 | A1* | 6/2014 | Lin | G16H 40/63 382/103 |
| 2014/0184496 | A1* | 7/2014 | Gribetz | G06F 3/017 345/156 |
| 2016/0012465 | A1* | 1/2016 | Sharp | G06Q 20/321 705/14.17 |
| 2017/0206797 | A1* | 7/2017 | Solomon | G06N 3/006 |
| 2017/0336874 | A1* | 11/2017 | Chun | G06F 3/017 |
| 2019/0096035 | A1* | 3/2019 | Li | G06N 3/063 |
| 2019/0179526 | A1* | 6/2019 | Yellen | G11B 27/00 |
| 2020/0160616 | A1* | 5/2020 | Li | G06V 10/776 |
| 2020/0387698 | A1* | 12/2020 | Yi | G06N 3/084 |
| 2021/0072877 | A1* | 3/2021 | Kim | H04L 67/08 |
| 2021/0279950 | A1* | 9/2021 | Phalak | G06F 18/231 |

FOREIGN PATENT DOCUMENTS

| | | | | | |
|---|---|---|---|---|---|
| CN | 104866216 | A | | 8/2015 | |
| CN | 106503756 | A | | 3/2017 | |
| CN | 106873893 | A | | 6/2017 | |
| CN | 107944457 | A | | 4/2018 | |
| CN | 108133197 | A | | 6/2018 | |
| CN | 108961414 | A | | 12/2018 | |
| CN | 109271023 | A | | 1/2019 | |
| CN | 110333785 | A | | 10/2019 | |
| CN | 110688965 | A | * | 1/2020 | G06T 7/11 |
| CN | 111064987 | A | | 4/2020 | |
| CN | 111107264 | A | | 5/2020 | |
| CN | 112599127 | A | | 4/2021 | |
| CN | 112766231 | A | | 5/2021 | |
| CN | 113325952 | A | | 8/2021 | |
| KR | 10-1662022 | B1 | | 10/2016 | |

OTHER PUBLICATIONS

Luo Na, Research of OpenCV-based Natural Gesture Recognition and Interactive System, Dissertation Submitted to Guangdong University of Technology, Jun. 2012, pp.

Notification of grant received for Chinese patent application No. 202111217427.3 mailed on Feb. 3, 2026, 7 pages (2 pages English Translation and 5 pages Original Copy).

Reed, B. S., Reconceptualizing mirroring: Sound imitation and rapport in naturally occurring interaction, Journal of Pragmatics, vol. 167, Oct. 2020, pp. 131-151.

* cited by examiner

METHOD, APPARATUS, ELECTRONIC DEVICE AND READABLE MEDIUM FOR PRESENTING

The present application claims priority to Chinese Patent Application No. 202111217427.3 filed on Oct. 19, 2021 with the CNIPA, the entirety of which is incorporated herein by reference.

FIELD

Embodiments of the present disclosure relates to the technical field of image processing, for example, to a method, apparatus, electronic device, and storage medium for presenting.

BACKGROUND

Many smart terminals and applications have a function for presenting, enabling one user to show an object to another in the form of an image or a video. For example, if a teacher draws a picture, he/she can show the picture to their students so that the students can learn and copy it, which greatly facilitates the process of teaching drawing and painting. The process requires the use of image or video processing techniques to recognize the displayed content of the user.

In related technologies, the recognition of the process for presenting mainly focuses on the recognition and analysis of the image drawn by the user on the screen or the drawing board, i.e., user A needs to draw actual content on the screen or the drawing board in order for user B to watch or learn. However, in the scene of online teaching via live streaming, the way of displaying by using the screen or the drawing board has a greater limitation. Moreover, the content drawn by the user usually contains only lines in a single form and lacks attractiveness, making it difficult to vividly and accurately display the actual content intended to be expressed by the user.

SUMMARY

The present disclosure provides a method, apparatus, electronic device, and storage medium for presenting to implement flexible interaction displays that enhance the attractiveness of the display process.

In a first aspect, embodiments of the present disclosure provide a method for presenting, comprising:

- determining operation information of a user from a video, the operation information comprising a motion trajectory of a hand of the user in the video;
- generating a profile of an object based on the motion trajectory;
- searching for corresponding information that matches the profile in a database; and
- presenting an image based on the corresponding information.

In a second aspect, embodiments of the present disclosure further provide an apparatus for presenting, comprising:

- a determination module configured to collect operation information of a user, the operation information comprising a motion trajectory of a hand of the user during a display process;
- a profile generation module configured to determine a profile of an object based on the motion trajectory;
- a matching module configured to search for corresponding information that matches the profile in a database; and
- a presenting module configured to generate an image based on the corresponding information.

In a third aspect, embodiments of the present disclosure further provide an electronic device, comprising:

- a processor; and
- a storage device storing a program,
- wherein the program, when executed by the processor, causes the processor to perform the method for presenting according to the first aspect.

In a fourth aspect, embodiments of the present disclosure further provide a computer-readable storage medium having a computer program thereon, the computer program, when executed by a processor, causing the method for presenting according to the first aspect.

DETAILED DESCRIPTION

Embodiments of the present disclosure will be described below with reference to the accompanying drawings. Although some embodiments of the present disclosure are shown in the accompanying drawings, it should be understood that the present disclosure can be implemented in various forms, and these embodiments are provided for a more thorough and complete understanding of the present disclosure. It should be understood that the drawings and embodiments of the present disclosure are intended to be exemplary only.

It should be understood that the various steps documented in the method embodiments of the present disclosure may be performed in a different order, and/or in parallel. In addition, the method embodiments may comprise additional steps and/or omit performing the illustrated steps. The scope of the present disclosure is not limited in this regard.

As used herein, the term "comprises" and its variations are open-ended, i.e., "comprising, but not limited to". The term "based on" is "based at least partially on". The term "one embodiment" represents "at least one embodiment";

the term "another embodiment" represents "at least one additional embodiment"; the term "some embodiments" represents "at least some embodiments". Related definitions of other terms will be given in the description below.

It should be noted that references to the concepts of "first", "second" and the like in the present disclosure are only used to distinguish different apparatuses, modules, or units, and are not intended to limit the order or interdependence of the functions performed by these apparatuses, modules, or units.

It should be noted that references to the qualifications "one" and "a plurality of" in the present disclosure are schematic rather than limiting. It should be understood by those skilled in the art that the term "one or more" should be understood unless the context clearly indicates otherwise.

The names of the messages or information that interacted between a plurality of devices in the present disclosure are for illustrative purposes only.

In the following embodiments, optional features and examples are provided in respective embodiment. A plurality of features described in the embodiments can be combined to form a plurality of optional solutions. Respective numbered embodiment should not be regarded as only one technical solution. In addition, the embodiments, and features in the embodiments of the present disclosure may be combined with each other when there is no conflict.

Embodiment 1

Figure 1:
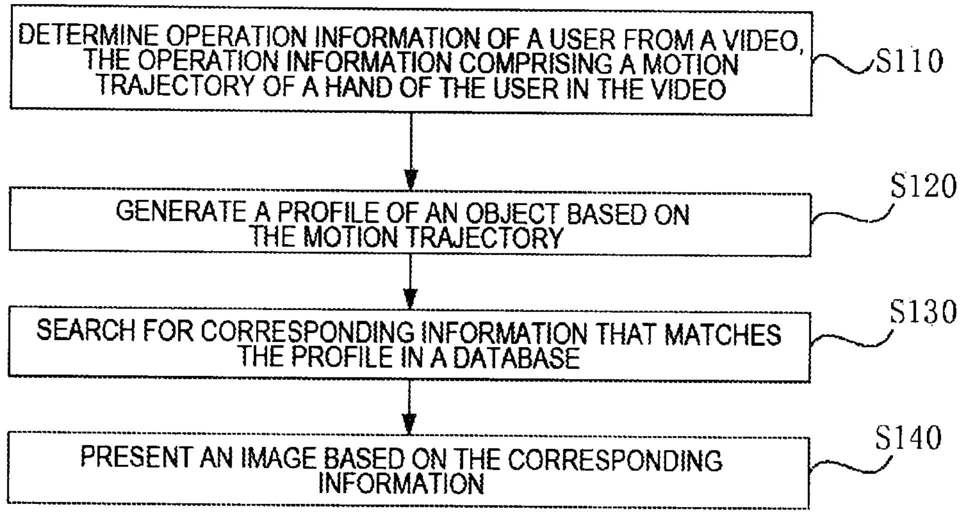
FIG. 1 shows a schematic flowchart of a method for presenting provided by embodiment 1 of the present disclosure.

FIG. 1 shows a schematic flowchart of a method for presenting provided by embodiment 1 of the present disclosure. The method is applicable to the case where the image is automatically generated based on the profile displayed by the user to provide to the learner or viewer, for example, it may be applicable in situations where the user is teaching drawing in a live stream scene. The method may be performed by the apparatus for presenting, wherein the apparatus may be implemented by software and/or hardware and is generally integrated into an electronic device. In the present embodiment, the electronic device may comprise: a computer, a mobile phone, a personal digital assistant, a computer, and other devices.

As shown in FIG. 1, embodiments of the present disclosure provide a method for presenting, comprising:

S110. Determine operation information of a user from a video, the operation information comprising a motion trajectory of a hand of the user in the vide.

In the present embodiment, the user mainly refers to the presenter, for example, it can be a painter, a painting teacher, or a user who performs any display operation such as painting teaching by an electronic device. Display operation mainly refers to the operation performed by the user to form an object during the display process. The object can be understood as the displayed content, such as the content drawn by the user. For example, the display operation can be an operation in which the user forms a specific trajectory by moving a finger or a hand-held object (such as chalk or laser pointer, etc.), or an operation in which the user uses gestures or body gestures to draw a specific shape, or an operation in which the user provides relevant information about the object to the electronic device by speech or instruction input. Operation information is mainly based on the information collected by the display operation of the user that can be used to determine the object. The operation information comprises at least the motion trajectory of the hand of the user during the display process. The electronic device mainly determines the object drawn by the user by recognizing the motion trajectory and completing the corresponding teaching process. In addition, the operation information may also comprise other information to assist the electronic device in more accurately determining the object, such as the trajectory of the arm of the user during the display process, the shape of the hand and limb of the user, and/or the physical object displayed in the hand of the user. For example, if the user gestures a heart shape with their hand, then in the case where the motion trajectory is basically a heart shape, the object can be more accurately determined as a heart shape based on the shape of the gesture; or if the user holds an apple in their hand, then in the case where the motion trajectory is basically an apple outline, the object can be more accurately determined as an apple based on the physical object displayed in their hand.

In the present embodiment, the hand may comprise the hand of the user, comprising palms and fingers, etc., and may also comprise a hand-held object. In this case, the hand of the user and the hand-held object may be regarded as a whole, the whole may be embodied as a point for determining the motion trajectory.

In one embodiment, collecting a motion trajectory of a hand of the user during a display process may comprise: collecting, by an image sensor in an electronic device, a plurality of frames of images of the display process of the user; respective frame of image comprising the hand of the user, and determining the hand as a whole as a point; the points in the plurality of frames of images form the motion trajectory of the hand in a temporal sequence.

S120. Generate a profile of an object based on the motion trajectory.

In one embodiment, the user mainly expresses the drawn content by strokes during the display process. For example, if the object is a cat, the hand of the user in the respective frame of the image is regarded as a point as a whole, and the dots in the plurality of frames of images are connected into a line in a temporal sequence to obtain a rough cat outline.

S130. Search for corresponding information that matches the profile in a database.

In the present embodiment, the predetermined database may refer to a database set in advance, the predetermined database contains a plurality of corresponding information. The corresponding information mainly refers to the information associated with the object for learners to learn. For example, the corresponding information comprises a template object associated with the object, wherein the object is based on the motion trajectory of the user prediction obtained, consistent with the exhibition diagram of the user, for example, the user wants to draw a cat; and the template object is based on the standard specified template image can be used for display, for example, can be a predetermined template image of a cat. By way of example, when it is recognized that the profile of the object conforms to the profile of the cat, the template image of the cat can be searched for from the predetermined database as the matching corresponding information. The corresponding information may also comprise texture and coloring information for the profile of the object and may also comprise text, patterns, or animations used to introduce the object-related knowledge explanation. For example, when the profile of the object matches the profile of the cat, the display of corresponding information can comprise a template image of the cat with any color or texture and can also comprise an explanation of the cat's size, breed, food, habits, and other related knowledge.

It is to be noted that a plurality of corresponding information can be matched in the predetermined database based on the determined profile of the object, and in order to accurately match one or several types of corresponding information, the corresponding information can be matched in a targeted manner based on the content of the auxiliary recognition object in the operation information or based on the user's speech instructions during the display process, and so on.

S140. Present an image based on the corresponding information.

In one embodiment, the image can be generated based on the corresponding information, and the image mainly refers to the content displayed to the learner or the viewer. Generating the image may be rendering the profile of the object, such as filling the profile with texture or coloring, etc., or adjusting the profile of the object based on a predetermined database to make it more realistic and beautiful, or styling the profile of the object, such as converting the object into a cartoon, oil painting, sketch, or hand-drawn style, etc., or directly displaying the corresponding information, such as the text or animation that has been searched. It is also possible to display the corresponding information by directly displaying the found text or animation, etc.

Figure 2:
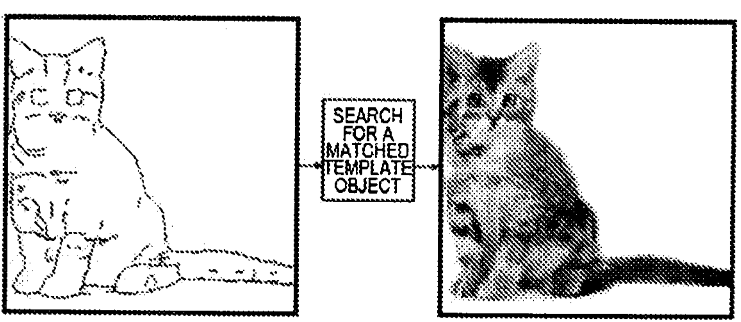
FIG. 2 shows a schematic diagram of a profile of an object and a matched corresponding information provided by embodiment 1 of the present disclosure.

FIG. 2 shows a schematic diagram of a profile of an object and a matched corresponding information provided by embodiment 1 of the present disclosure. As shown in FIG. 2, taking the interaction display in the painting teaching scene. By way of example, the left side is the profile of the object determined based on the hand motion trajectory, which can be seen as a cat; the right side is the template object that matches the profile, and the cat in the template object has a color and texture. When generating the images, the template object can be determined directly as the images, or on the basis of the template object can be added to the display of other corresponding information, such as the explanation of the object's size, breed, food and habits and other related data.

Embodiments of the present disclosure provide a method for presenting, the method automatically generates images based on the motion trajectory of the hand of the user, combined with the corresponding information of the display, which can be freely played by the user, making the display operation more flexible. At the same time, based on the profile displayed by the user, it can provide the corresponding information of the display required to enhance the attractiveness and interactivity of the interactive display, so as to enhance the experience of the learner or viewer.

Embodiment 2

Figure 3:
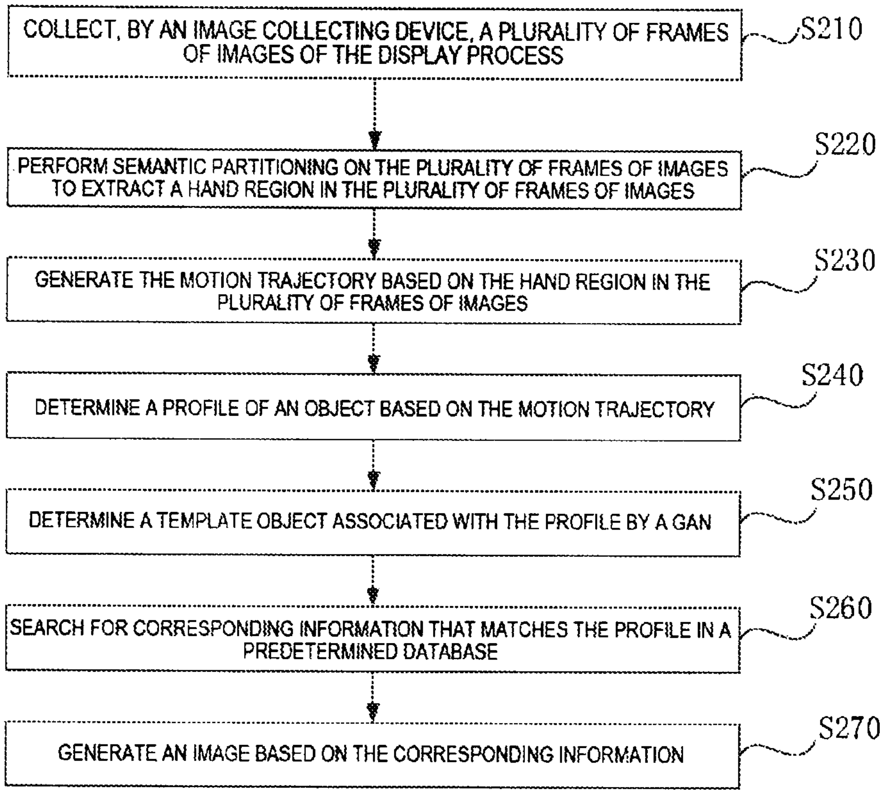
FIG. 3 shows a schematic flowchart of a method for presenting provided by embodiment 2 of the present disclosure.

FIG. 3 shows a schematic flowchart of a method for presenting provided by embodiment 2 of the present disclosure. Embodiment 2 of the present embodiment is based on the above embodiment, and changes are made to the collecting of operation information of the user and the searching for display correspondence information that matches the profile in the predetermined database.

In the present embodiment, collecting operation information of a user comprises: collecting, by an image collecting device, a plurality of frames of images of the display process; performing semantic partitioning on the plurality of frames of images to extract a hand region in the plurality of frames of images; and generating the motion trajectory based on the hand region in the plurality of frames of images. On this basis, by performing semantic partitioning on the collected plurality of frames of images, the trajectory motion of the hand can be accurately recognized to provide a basis for searching for the corresponding information.

In the present embodiment, searching for corresponding information that matches the profile in a predetermined database comprises: determining a template object associated with the profile by a generative adversarial network (GAN); and searching for corresponding information of the template object in the predetermined database. On this basis, accurate template objects can be obtained with the generative adversarial network based on the profile of the object, so as to search for the matched corresponding information and avoid deviation between the corresponding information and the object.

As shown in FIG. 3, embodiment 2 of the present disclosure provides a method for presenting, comprising:

S210. Collect, by an image collecting device, a plurality of frames of images of the display process.

In the present embodiment, the image of the display process mainly refers to the image including the hand of the user, which may be captured by an image collecting device (e.g., a camera, camcorder, etc.). The plurality of frames of images of the display process includes at least the hand region of the user but may also include the arm region of the user, the objects on the hand, and the background region.

S220. Perform semantic partitioning on the plurality of frames of images to extract a hand region in the plurality of frames of images.

Semantic partition is to classify respective pixel in the image, determining the category of respective point (e.g., belonging to a background or foreground target, etc.), and thus divide the region.

In the present embodiment, based on the semantic partition, first of all, a plurality of frames of images in the display process of the respective pixel is classified to determine the category of respective point, for example, belonging to the hand, arm, hand-held items, or background, and then the region is divided based on the category in order to extract the region of the hand in the plurality of frames of images.

S230. Generate the motion trajectory based on the hand region in the plurality of frames of images.

In the present embodiment, the motion trajectory may be generated based on the hand regions in the extracted plurality of frames of images.

By way of example, the method of semantic partitioning can be performed on hands, arms, hand-held items, and backgrounds, and then perform a plurality of objects tracking on an external rectangular box of masks for different targets, and return the masks of hands, hand-held items, arms, and backgrounds in real-time. The queue of hand-held items in the previous plurality of frames and the current frame of the external rectangular box can generate at least the motion trajectory of the hand based on the queue of the external rectangular box.

S240. Determine a profile of an object based on the motion trajectory.

S250. Determine a template object associated with the profile by a GAN.

A template object can be considered to be a template image that is complexly associated with the profile of the object (with features other than the profile, e.g., texture and color information, etc.), and the appearance of the template image is supposed to match the profile of the object.

In one embodiment, the template object associated with the profile can be determined by the GAN based on the profile of the object, and the determined template object can be used to search for the corresponding information of the subsequent template object. Herein, GAN is a deep learning model, which consists of two basic neural networks, i.e., a generator neural network (Generator Neural Network) and a discriminator neural network (Discriminator Neural Network). After continuous confrontation and training, the GAN has the ability to obtain the desired output based on the input. In the present embodiment, through the GAN, for example, through a pix2pix network, paired image conversion can be completed, i.e., corresponding template objects are generated based on the profile of the object, and matched corresponding information is searched in the predetermined database.

As an achievable way, the way of determining the template object can be: a complex template object can be associated with the generative adversarial network based on a simple profile formed by a hand trajectory. By way of example, referring to FIG. 2, a user draws a stroke image of a cat with their hand, and a template object related to the stroke of the cat can be generated by the generative adversarial network. For example, the template object is a cat with only color and texture.

S260. Search for corresponding information that matches the profile in a predetermined database.

Based on the template object determined by the GAN, the corresponding information of the template object can be searched for in the predetermined database.

S270. Generate an image based on the corresponding information.

According to the method for presenting In the present embodiment, the motion trajectory of the hand can be accurately obtained by performing semantic partitioning on the plurality of frames of images, improving the accuracy of profile recognition, and thus providing effective display correspondence information and images; using the generative adversarial network allows the searching for corresponding information to better match the profile of the object, avoiding deviations, thus improving the efficiency and reliability of the interaction display, and enabling the learners to quickly and accurately learn the content of the display.

As an optional embodiment, after collecting the plurality of frames of images of the display process, it is added that, perform semantic partitioning on the plurality of frames of images to extract a non-hand region in the plurality of frames of images; and correct the motion trajectory based on the non-hand region in the plurality of frames of images.

In the present embodiment, the non-hand region may refer to a plurality of frames of images in the region other than the hand region, for example, it may be an arm region or a hand-held object region. It is understood that due to human or systematic influences, the motion trajectory generated from the hand region may have deviations, and in order to ensure the accuracy of the trajectory recognition, the motion trajectory can be corrected using other regions.

In an embodiment, after collecting the plurality of frames of images of the display process, perform semantic partitioning on the plurality of frames of images firstly to extract a non-hand region in the plurality of frames of images; and then correct the motion trajectory based on the non-hand region in the plurality of frames of images.

By way of example, after collecting the plurality of frames of images of the display process, perform semantic partitioning on the plurality of frames of images firstly and extract an arm region in the plurality of frames of images, then correct the motion trajectory based on the arm region in the plurality of frames of images. For example, based on the posture of the arm in the respective frame of the image, the position of the hand can be corrected.

The purpose of adding the correction step in this optional embodiment is to finely adjust the trajectory points on the motion trajectory based on the gesture of the non-hand region on the basis of the generation of the motion trajectory based on the hand region, so as to improve the correctness of recognizing the profile of the object.

As an alternative embodiment, after extracting the plurality of frames of images in the hand region, it is also added that: recognize, based on the hand region in the plurality of frames of images, at least one of a hand posture and a hand-held object; and determine a category of the object based on the at least one of the hand posture and the hand-held object.

Hand posture can be understood as an action that roughly reflects the object, while hand-held object can be understood as an object that roughly reflects the object. For example, the hand posture can be a user gesturing a heart shape with their hand, and the hand-held object can be a user holding an apple, etc.

In one embodiment, after extracting the hand region in the plurality of frames of images, at least one of a hand posture and a hand-held object can be recognized based on the hand region in the plurality of frames of images, and then the category of the object can be determined based on at least one of hand posture and hand-held object, for example, the object is determined to be a cat. On this basis, a stroke image for the object can be provided for user reference.

On the basis of the present optional embodiment, the category of the object can be determined in advance, and then the step of searching for the corresponding information in the predetermined database based on the profile of the object can be performed subsequently. The purpose of this optional embodiment is to narrow the scope of searching for the corresponding display information in the predetermined database to improve the searching efficiency or to verify the searching display information based on the category of the object to ensure that the searching display information can be found in the predetermined database.

By way of example, there are cats and dogs in the predetermined database, and the cats have different shapes or colors, etc., the category of the object can be roughly determined to be a cat based on at least one of the hand posture and the hand-held object. In the process of determining the category, a reference stroke image of the cat can be roughly generated, and then the user can determine that the object is indeed a cat in a sitting or lying posture based on the profile of the cat drawn by the user to obtain the matched display correspondence information and generate the images; alternatively, the display correspondence information can be searched for based on the profile of the object, and when the display correspondence information is searched, the user can determine that the object is indeed a cat in a sitting or lying posture based on the drawing of the user and the user can determine that the object is indeed a cat in a sitting or lying posture based on the drawing of the user and generate the images. For example, if the template object is a cat in a sitting or lying position, the category (stroke reference) is determined from at least one of the hand posture and the hand-held object is also a cat, and the two match, so the correctness of the display correspondence information is verified. Based on this, errors in displaying correspondence information can be avoided, for example, when the object is a cat but an image with the correspondence information of a dog is found to be displayed.

In an optional embodiment, a method of implementation of generating an image based on display correspondence information is given, wherein the display correspondence information comprises rendering information of an object, the rendering information may be obtained based on a difference between a profile of the object and a template object, and the rendering information comprises information that causes the profile of the object to have a characteristic such as a color or a texture.

In the alternative embodiment, the profile is rendered based on the rendering information to obtain an image. Herein, perform rendering on the profile of an object, e.g., by adding patterns and/or colors to the inside of the profile, etc. When the corresponding information of the display comprises rendering information of the object, the profile can be rendered based on the rendering information, and the image can be obtained, so as to implement a personalized display of the image, and to improve the visual effect of the interactive display process.

As an alternative embodiment, the image comprises a template object and explanation information of the template object, after generating the image based on the corresponding information, it is further added that: display the template object in a first region and display the explanation information in a second region.

In the present embodiment, the first region can be the left region of the screen, and the second region can be the right region of the screen. The specific positions of the first region and the second region in this optional embodiment can be defined based on the actual situation. Generally, the first region and the second region have no overlapping parts; the form of explanation information can be text, pictures, animations, English, etc. On this basis, when the image comprises the template object and the explanation information of the template object, the template object is displayed in the first region and the explanation information is displayed in the second region to display vivid and rich corresponding information so that learners or viewers can quickly and accurately learn the displayed content.

Embodiment 3

Figures 4, 5:
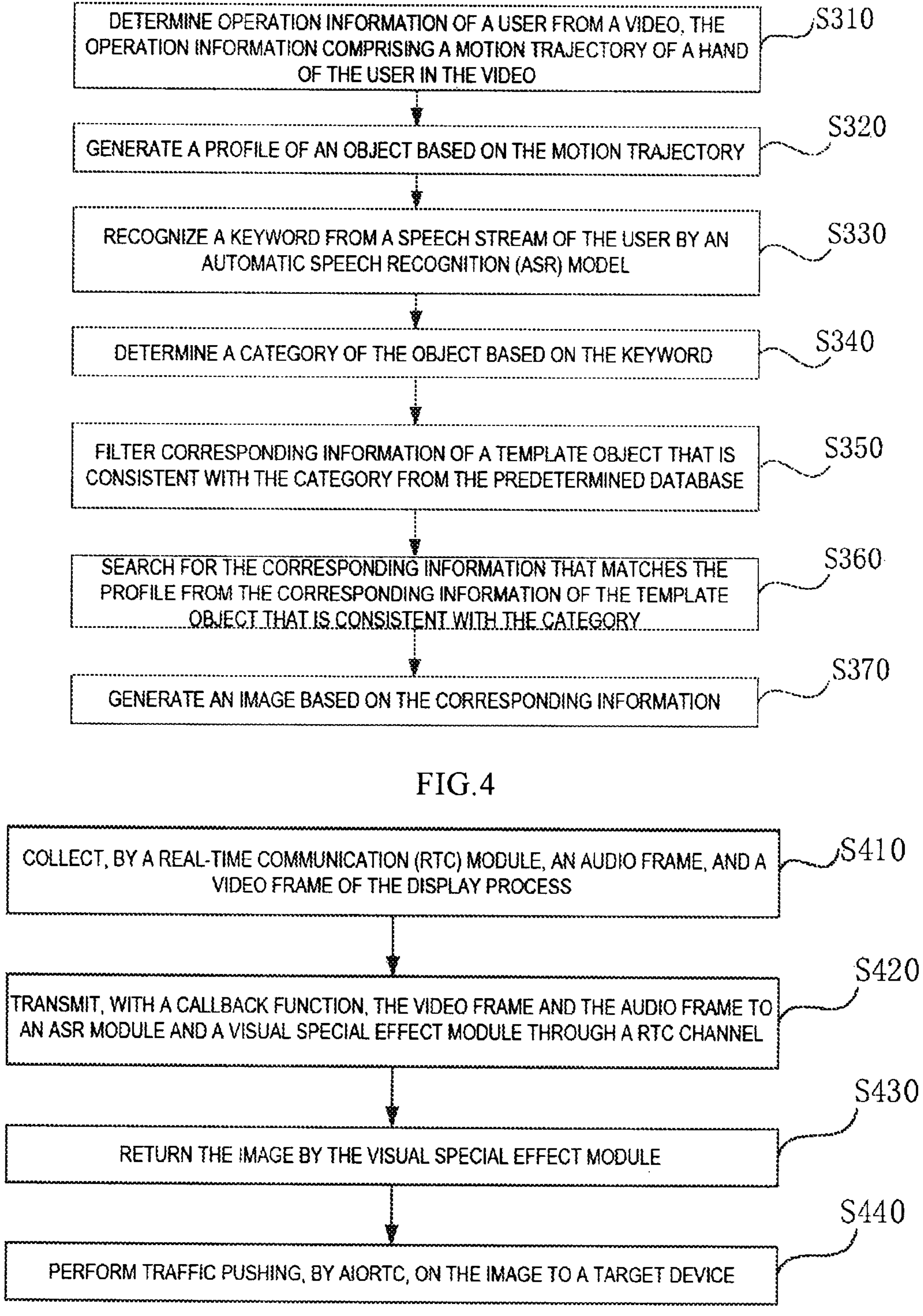
FIG. 4 shows a schematic flowchart of a method for presenting provided by embodiment 3 of the present disclosure.
FIG. 5 shows a schematic flowchart of a method for presenting provided by embodiment 4 of the present disclosure.

FIG. 4 shows a schematic flowchart of a method for presenting provided by embodiment 3 of the present disclosure. Embodiment 3 is based on the above embodiments, and changes are made to search for displaying corresponding information in a predetermined database.

In the present embodiment, before searching for corresponding information that matches the profile in a predetermined database, it further comprises: recognizing a keyword from a speech stream of the user by an automatic speech recognition (ASR) model; and determining a category of the object based on the keyword. On this basis, based on the motion trajectory of the hand of the user, the object can be accurately determined in combination with the keywords to ensure the reliability of the interaction display.

In the present embodiment, searching for corresponding information that matches the profile in a predetermined database comprises: filtering corresponding information of a template object that is consistent with the category from the predetermined database; and searching for the corresponding information that matches the profile from the corresponding information of the template object that is consistent with the category. On this basis, by first determining the category of the object can narrow down the range of searching for the corresponding information in the predetermined database, which improves the efficiency and correctness of searching for the corresponding information.

As shown in FIG. 4, embodiment 3 of the present disclosure provides a method for presenting, comprising:

S310. Determine operation information of a user from a video, the operation information comprising a motion trajectory of a hand of the user in the video.

S320. Generate a profile of an object based on the motion trajectory.

S330. Recognize a keyword from a speech stream of the user by an automatic speech recognition (ASR) model.

In the present embodiment, the keywords mainly refer to words related to the object spoken by the user, etc., and may be used to assist in determining the category of the object. The keywords can be recognized from the user's speech stream. In a display process, there may be one or more objects, and accordingly, the number of keywords may also be one or more. The lexical nature of the keywords is not limited. For example, a keyword can be a noun, which can be a collective term for a class of people or objects, such as "cat", "little friend" or "flower", etc. If such words are recognized in the user's speech stream, they can be used as keywords to provide a basis for determining the category of the object. In addition, the keywords may be accompanied by quantifiers, such as "a cat" or "a flower", or by verbs related to the display operation, such as "draw", Keywords may also appear with verbs related to display operations, such as "draw", "paint", "describe", "show", "show", and so on. When the user mentions such verbs, the noun following the verb may be the keyword; the keyword may also be a short sentence or instruction, such as "draw a cat", "draw a flower", etc.

It is to be understood that the user may engage in speech communication during the display process, and these speech communications may comprise keywords. In the present embodiment, keywords can be recognized by automatic speech recognition ASR technology that converts speech into text in real time. Herein, the ASR technology takes speech as the research object and converts speech signals into corresponding text or commands. This technology can convert text in real-time, thus improving real-time performance, which is especially suitable for interactive displays in live streaming scenes. By recognizing keywords in real-time, the images can be quickly and automatically generated based on the profile of the object to improve the efficiency and real-time interactive display.

In this implementation, the speech of the user in the display process can be converted into text in real-time, so that the converted text can be recognized as keywords, and on this basis, based on the keywords, combined with the profile of the object, to search for the corresponding information of the display that matches the profile, so as to enable the search of the corresponding information of the display to be more accurate.

S340. Determine a category of the object based on the keyword.

S350. Filter corresponding information of a template object that is consistent with the category from the predetermined database.

The category of the object can be determined by the above steps, and then the corresponding information of the template object consistent with the category in the predetermined database can be filtered, and then the subsequent searching for the corresponding information that matches the profile can be performed. Herein, objects belonging to the same category may comprise a plurality of colors, breeds, or sizes, etc., so the filtering process can be combined with the keywords in the speech communication to filter. For example, the category of the object is "cat", but the "cat" belonging to the same category may also comprise cats with different postures, different colors, or different textures, so the filtering process can be combined with the keywords not filtered in the speech communication, for example, the keywords may comprise "Draw a yellow cat".

S360. Search for the corresponding information that matches the profile from the corresponding information of the template object that is consistent with the category.

For example, it is possible to select the matched corresponding information from the corresponding information of the template objects related to cats. Based on this, the scope of searching for corresponding information in the predetermined database can be narrowed down, and the efficiency and correctness of searching for corresponding information can be improved.

S370. Generate an image based on the corresponding information.

The method for presenting in the present embodiment, by the keywords recognized by the ASR model, combined with the profile of the object, can enable to search for the corresponding information more accurately and improve the real-timeliness of the interaction display.

It is understood that determining the category of the object based on the keywords in the speech stream can narrow down the scope of searching for the corresponding information in the predetermined database and improve the efficiency of searching, or the corresponding information searched for can be verified based on the category of the object to ensure the correctness of searching for the corresponding information.

The following is an example to illustrate the process for presenting: take the teaching process of painting as an example, the painter starts the live stream software by using an electronic device (e.g., computer, tablet, cell phone, etc.), and says, "Attention, please, I am going to paint a corn", and then starts to paint, and then moves his hand to form a stroke image of corn, and the image collecting device will capture the trajectory of the teacher's hand in real-time, and determine the outline of the object as corn based on the trajectory, so as to find the corresponding information in the predetermined database.

In addition, the ASR model can also recognize that the keyword in the speech stream includes "a corn", and thus determine the category of the object as "corn"; filter the corresponding information of the template object in the predetermined database that is consistent with "corn"; search for the corresponding information that matches the profile of the object from the corresponding information that is consistent with "corn"; and finally generate the image that comprises a corn with color or texture, the appearance of which matches the shape of the stroke image formed by the motion trajectory of the hand of the user.

As an alternative embodiment, recognizing a keyword from a speech stream of the user by an ASR model comprises: segmenting the speech stream to obtain segments of the speech stream, and storing the segments of the speech stream in a buffer; recognizing keywords from respective ones of the segments by the ASR model, and determining confidences of the keywords; and determining a keyword with a highest confidence as the keyword in the speech stream. Herein, the confidence can be understood as the probability that the current keyword is a keyword.

In one embodiment, storing the segments of the speech stream in a buffer can be understood as the speech stream is segmented to obtain segments of the speech stream, and the segments of the speech stream are stored in the buffer.

It should be noted that the speech stream of the user during the display process may include keywords or non-keywords, such as words that are not related to the display operation or words that lead to the keywords. In the present embodiment, by storing the segments of the speech stream in a buffer, the keywords in respective segment are recognized and the confidence of the keywords is determined, wherein the method of determining the confidence of the keywords can be based on, for example, whether or not there is a quantifier before or after the keyword, whether or not there is a specified verb, whether or not there is a template object related to the keyword in the predetermined library, and so on. For example, we can store "Attention students" in the buffer, which does not include the keyword, and "I draw a corn" in the buffer, which includes the keyword "corn" and has a higher confidence. The keyword "corn" is stored in the buffer and the confidence is relatively high. By storing and recognizing the speech stream in segments, the processing dimension of the speech data can be reduced, the interference of irrelevant words can be eliminated, and the efficiency and accuracy of keyword recognition can be improved; on this basis, the keyword with the highest confidence is taken as the keyword in the speech stream, which provides a reliable basis for determining the object.

Embodiment 4

FIG. 5 shows a schematic flowchart of a method for presenting provided by embodiment 4 of the present disclosure. Embodiment 4 is based on the above embodiment, and changes are made to implement an interaction display by building a real-time communication conference system.

In the present embodiment, collecting operation information of a user comprises: collecting, by a real-time communication (RTC) module, an audio frame, and a video frame of the display process; and transmitting, with a callback function, the video frame and the audio frame to an ASR module and a visual special effect module through a RTC channel. On this basis, the audio and video signals of the user in the process of display can be obtained in real-time and transmitted to the corresponding receiving module in real-time, which improves the efficiency of the interactive display. In addition, by processing audio frames and video frames separately, the keywords are extracted from audio frames and the profile of the object is recognized from video frames, and the combination of the two improves the image.

In the present embodiment, after generating an image based on the corresponding information, further comprises: performing traffic pushing, by Aiortc, on the image to a target device. On this basis, it is ensured that the images are reliably displayed on the target device in real-time.

As shown in FIG. 5, embodiment 4 of the present disclosure provides a method for presenting, comprising:

S410. Collect, by a real-time communication (RTC) module, an audio frame, and a video frame of the display process.

In the present embodiment, the operation information comprises an audio frame and a video frame. The audio frame comes from the speech stream signal during the display process, and the video frame may refer to image frames collected during the display process. In the present embodiment, the audio frame and video frame of the display process can be collected in real time by the real-time communication (RTC) module. Herein, RTC is the basis for real-time communication, mainly responsible for the real-time transmission of the audio frame and the video frame. The RTC module provides encoding and packaging of the audio frame and the video frame, i.e., Socket transmission, and can also implement the control signaling required for the transmission of the audio frame and the video frame, such as posting, subscription controlling, bit rate adjustment and other functions. On the one hand, the RTC module can implement collecting the audio frame and the video frame and sending the collected the audio frame and the video frame to the processing module. On the other hand, the processing module sends the processed images to the RTC module, and the RTC module can post the images to the target object.

S420. Transmit, with a callback function, the video frame and the audio frame to an ASR module and a visual special effect module through a RTC channel.

In the present embodiment, the ASR module is configured to receive an audio frame, and the received audio frame may be used to assist in recognizing an object, for example, by segmenting the audio frame and recognizing keywords, the category of the object may be determined based on the keywords; visual special effect module is configured to receive video frames, and recognition of a hand motion trajectory and determination of an object profile may be completed based on the received video frames.

In one embodiment, when the RTC module is built in the early stage, the RTC channel is added by the front-end of the RTC, the audio and video obtaining function of the electronic device is started, and then the audio frame and video frame of the display process are collected through the RTC module, and the video frame and audio frame are transmitted, with a callback function, to the ASR module and the visual special effect module.

S430. Return the image by the visual special effect module.

The image may be obtained by processing the hand detection, tracking module and the tracking feedback module, for example, the hand detection and tracking module is configured to process the video frame and generate a motion trajectory of the hand, and the tracking feedback module is configured to determine a profile of the object based on the motion trajectory; the visual effects module may return the image generated based on the display correspondence information that matches the profile, for example, by searching for the corresponding information that matches the profile in the predetermined database, and generating the image based on the corresponding information.

S440. Perform traffic pushing, by Aiortc, on the image to a target device.

In the present embodiment, the target device may refer to a device for viewing the live stream, for example, a client such as a cell phone or a computer used by a student. In the present embodiment, perform traffic pushing, by Aiortc, on the image obtained in the previous step to the target device.

Herein, the Aiortc has a simple and easy-to-implement structure and can provide Python bindings and channels for exchanging audio and video data.

Figure 6A:
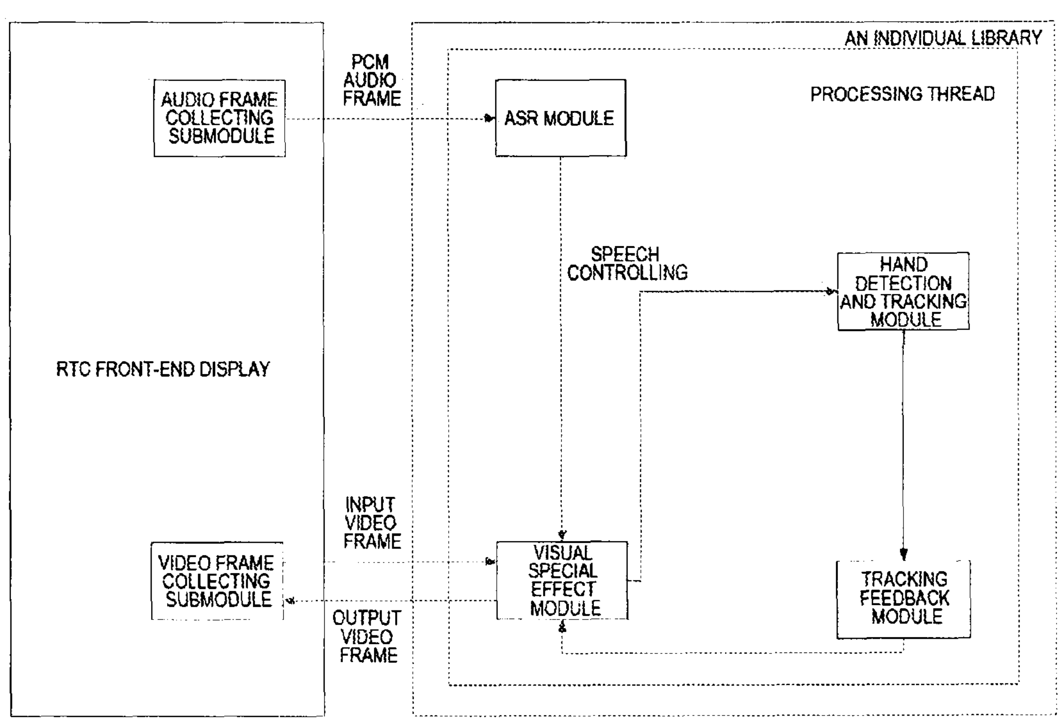
FIG. 6*a* shows a schematic diagram of implementing interaction display based on real-time communication provided by embodiment 4 of the present disclosure.

FIG. 6*a* shows a schematic diagram of implementing interaction display based on real-time communication provided by embodiment 4 of the present disclosure. The present embodiment can implement an RTC-based interaction display by C++. As shown in FIG. 6*a*, the left side is the RTC module, which is configured to collect Pulse Code Modulation (PCM) audio frames and video frames during the collecting display process. The RTC module may comprise an audio frame collecting submodule and a video frame collecting submodule. The audio frames and video frames collected by the two submodules are respectively transmitted to the ASR module and the visual special effect module. Herein, the audio frames and video frames can be processed by different processing modules, and the processing modules of the audio frames and video frames can be written as relatively independent static or dynamic libraries. The processing results (i.e., keywords) of the audio frames can assist the visual special effect module in determining the corresponding information and generating images. The combination of the two improves the accuracy of the display. In addition, the ASR module and the visual special effect module can be relatively independent and asynchronous to implement efficient processing.

Figure 6B:
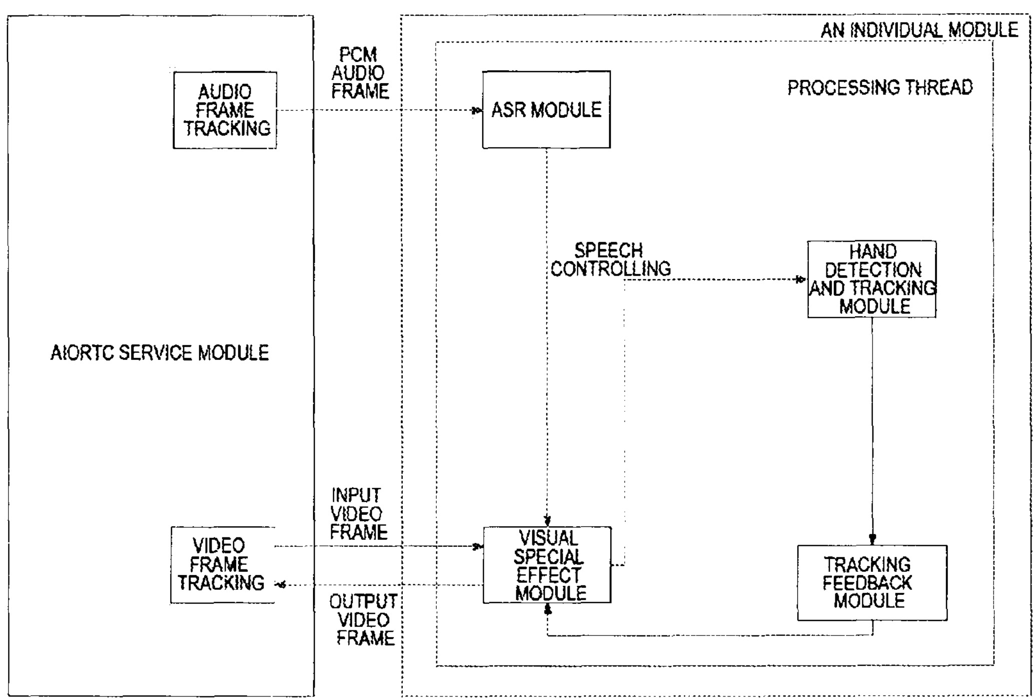
FIG. 6*b* shows a schematic diagram of implementing interaction display based on real-time communication provided by embodiment 4 of the present disclosure.

FIG. 6*b* shows a schematic diagram of implementing interaction display based on real-time communication provided by embodiment 4 of the present disclosure. The present embodiment can implement an RTC-based interaction display by Python. As shown in FIG. 6*b*, the left side is the Aiortc service module, which is configured to track audio frames and video frames during the display process, and perform traffic pushing on the images returned by the visual special effect module to the target device; the Aiortc service module may comprise an audio frame tracking submodule and a video frame tracking submodule, and the audio frames and video frames tracked by the two submodules are transmitted respectively to the ASR module and the visual special effect module. On this basis, the audio frames and video frames can be processed by the same or different processing modules.

Optionally, the real-time communication system also comprises a hand detection and tracking module, which can be configured to recognize hand regions and motion trajectories, thereby supporting users to freely outline, draw; or create on the screen; the tracking feedback module can be configured to draw outlines and search for template objects and corresponding information to return to the visual special effect module. In addition, by using Lua logic judgment, the complete result of the color pattern returned by the algorithm can be displayed for the outlined pattern drawn by the result. In addition, it is also possible to implement a personalized display of the results, such as the introduction of a virtual whiteboard to display rich corresponding information, etc.

In the method for presenting of the present embodiment, the audio and video signal of the display process can be obtained in real-time by the real-time communication (RTC) module, and transmitted in real-time to the corresponding receiving module, which improves the efficiency of the interaction display; perform traffic pushing, by Aiortc, on the image to a target device, to ensure that the image reliably displayed in real-time on the target device; in addition, personalized display can also be implemented on the image, to display rich corresponding information, and improve the attractiveness and interactivity of the interaction display.

Embodiment 5

Figure 7:
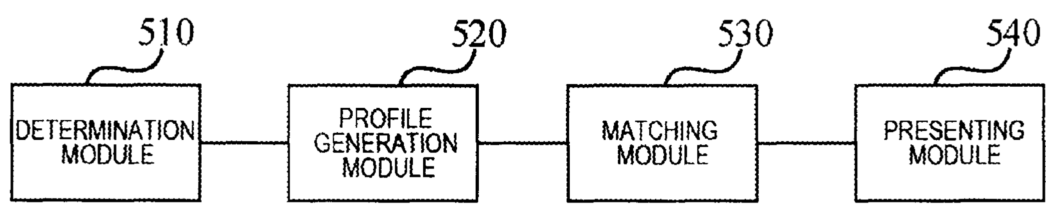
FIG. 7 shows a structural schematic diagram of an apparatus for presenting provided by embodiment 5 of the present disclosure.

FIG. 7 shows a structural schematic diagram of an apparatus for presenting provided by embodiment 5 of the present disclosure. The apparatus may be implemented by a software and/or a hardware and is generally integrated on an electronic device.

As shown in FIG. 7, the apparatus comprises:

a determination module 510 configured to determine operation information of a user from a video, the operation information comprising a motion trajectory of a hand of the user in the video;

a profile generation module 520 configured to generate a profile of an object based on the motion trajectory;

a matching module 530 configured to search for corresponding information that matches the profile in a database; and a presenting module 540 configured to present an image based on the corresponding information.

The apparatus for interaction display of the present embodiment can automatically generate the images based on the motion trajectory of the hand of the user, combined with the corresponding information, and the user can give free play to enable the display operation to be more flexible. At the same time, based on the profile displayed by the user, it can provide the required corresponding information to enhance the attractiveness of the interaction display and the interactivity.

Based on the above, the determination module 510 comprises:

a collecting unit configured to collect, by an image collecting device, a plurality of frames of images of the display process;

a hand region extracting unit configured to perform semantic partitioning on the plurality of frames of images to extract a hand region in the plurality of frames of images; and a motion trajectory generating unit configured to generate the motion trajectory based on the hand region in the plurality of frames of images.

Based on the above, the matching module 530 comprises:

a template object determination unit configured to determine a template object associated with the profile by a GAN; and a corresponding information searching unit configured to search for corresponding information of the template object in the predetermined database.

Based on the above, the determination module 510 further comprises:

a non-hand region extracting unit configured to perform semantic partitioning on the plurality of frames of images to extract a non-hand region in the plurality of frames of images;

a motion trajectory correction unit configured to correct the motion trajectory based on the non-hand region in the plurality of frames of images.

Based on the above, the determination module 510 further comprises:

a recognition unit configured to recognize, based on the hand region in the plurality of frames of images, at least one of a hand posture and a hand-held object; and a category determination unit configured to determine a category of the object based on the at least one of the hand postures and the hand-held object.

On the basis of the above, before searching for corresponding information that matches the profile in a predetermined database, the apparatus further comprises: a speech recognition module, comprising:

a keyword recognition unit configured to recognize a keyword from a speech stream of the user by an automatic speech recognition (ASR) model; and a determination unit configured to determine a category of the object based on the keyword.

Based on the above, the matching module 530 comprises:

a corresponding information filtering unit configured to filter corresponding information of a template object that is consistent with the category from the predetermined database; and a searching unit configured to search for the corresponding information that matches the profile from the corresponding information of the template object that is consistent with the category.

Based on the above, the keyword recognition unit is configured to:

segment the speech stream to obtain segments of the speech stream, and store the segments of the speech stream in a buffer;

recognize keywords from respective ones of the segments by the ASR model, and determine confidences of the keywords; and determine a keyword with a highest confidence as the keyword in the speech stream.

Based on the above, the determination module 510 comprises:

a frame collecting unit configured to collect, by a real-time communication (RTC) module, an audio frame, and a video frame of the display process; and a transmission unit configured to transmit, with a callback function, the video frame and the audio frame to an ASR module and a visual special effect module through a RTC channel.

On the basis of the above, after generating an image based on the corresponding information, the apparatus further comprises: a traffic pushing module, comprising:

performing traffic pushing, by Aiortc, on the image to a target device.

On the basis of the above, the corresponding information comprises rendering information of the display object; and the presenting module 540 is configured to:

render the profile based on the rendering information to obtain the image.

On the basis of the above, the image comprises a template object and explanation information of the template object; and after generating an image based on the corresponding information, the apparatus further comprises: a display module configured to:

display the template object in a first region and display the explanation information in a second region.

The apparatus for presenting may perform any embodiment of the present disclosure method for presenting provided above, the method comprises performing the corresponding functional modules and beneficial effects.

Embodiment 6

Figure 8:
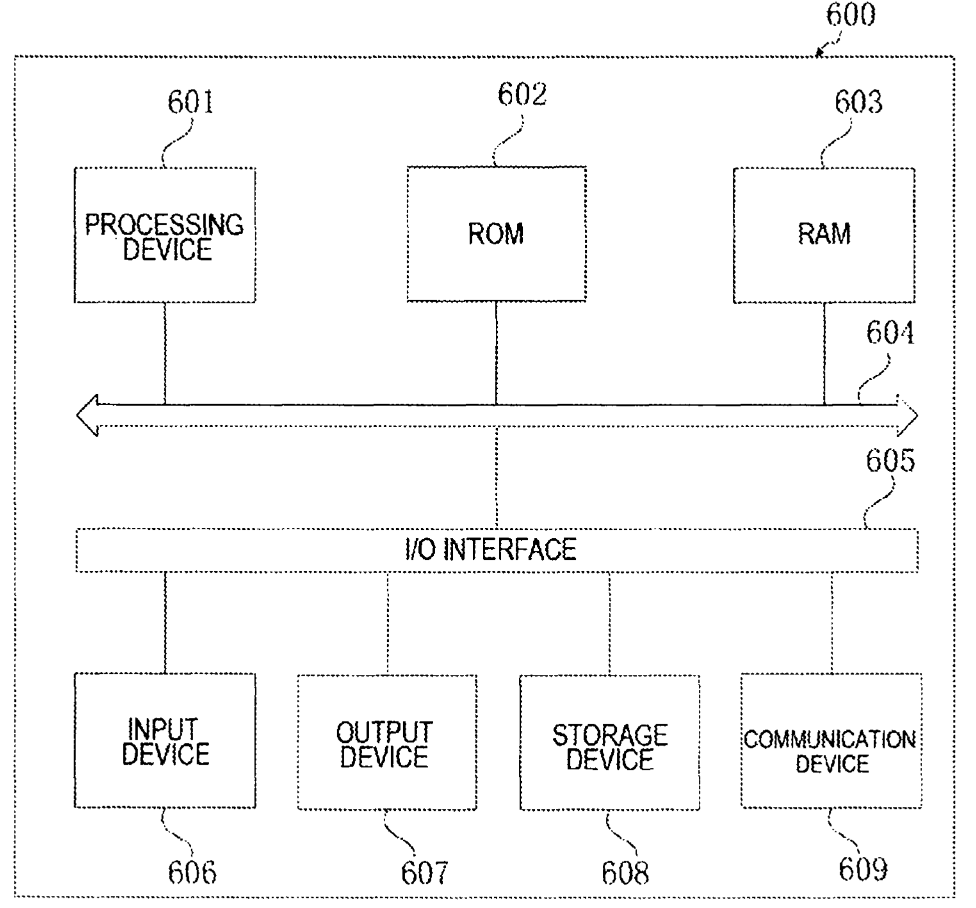
FIG. 8 shows a structural schematic diagram of an electronic device provided by embodiment 6 of the present disclosure.

FIG. 8 shows a structural schematic diagram of an electronic device provided by embodiment 6 of the present disclosure. FIG. 8 illustrates a structural schematic diagram of an electronic device 600 suitable for use in implementing embodiments of the present disclosure. The electronic device 600 in embodiments of the present disclosure may comprise a cell phone, a laptop computer, a digital broadcast receiver, a Personal Digital Assistant (PDA), a Portable Android Device (PAD), a Portable Media Player (PMP), an in-vehicle terminal (e.g., an in-vehicle navigation terminal), and the like, and fixed terminals such as a digital television (TV), a desktop computer, and the like. The electronic device illustrated in FIG. 8 is merely an example.

As shown in FIG. 8, the electronic device 600 may comprise one or more processing devices (e.g., a central processor, a graphics processor, etc.) 601, which may perform a variety of appropriate actions and processes based on a program stored in Read-Only Memory (ROM) 602 or loaded from the storage device 608 into Random Access Memory (RAM) 603 to perform various appropriate actions and processes. One or more processing device 601 implement methods as provided in the present disclosure. Various programs and data required for operation of the electronic device 600 are also stored in the RAM 603. The processing device 601, the ROM 602, and the RAM 603 are connected to respective other via the bus 604. An input/output (I/O) interface 605 is also connected to bus 604.

Generally, the following devices may be connected to the I/O interface 605: an input device 606 comprising, for example, a touch screen, a touch pad, a keyboard, a mouse, a video camera, a microphone, an accelerometer, a gyroscope, and the like; an output device 607 comprising, for example, a liquid crystal display (LCD), a speaker, a vibrator, and the like; a storage device 608 comprising, for example, a magnetic tape, a hard disk, and the like, and the storage device 608 being used to store one or more programs; and a communication device 609. The communication device 609 may allow the electronic device 600 to communicate wirelessly or wiredly with other devices to exchange data. Although FIG. 8 illustrates electronic device 600 with various devices, it should be understood that it is not required to implement or have all of the illustrated devices. More or fewer devices may alternatively be implemented or possessed.

According to the embodiments of the present disclosure, the process described with reference to the flowchart above may be implemented as a computer software program. For example, embodiments of the present disclosure comprise a computer program product comprising a computer program anchored on a non-transitory computer-readable medium, the computer program comprising program code for executing the method shown in the flowchart. In such embodiments, the computer program may be downloaded and installed from a network via the communication device 609, or from the storage device 608, or from the ROM 602. When the computer program is executed by the processing device 601, the above functions defined in the method of the embodiments of the present disclosure are performed.

It should be noted that the computer-readable medium described above in the present disclosure may be a computer-readable signal medium or a computer-readable storage medium or any combination thereof. The computer-readable storage medium may, for example, be a system, device, or apparatus or device of electricity, magnetism, light, electromagnetism, infrared, or semiconductors, or an electrical connection of any one or more wires, or a combination of the above. The computer-readable storage medium may comprise: portable computer disk, hard disk, random access memory (RAM), read-only memory (ROM), erasable programmable read-only memory (EPROM, or flash memory), optical fiber, compact disc read-only memory (CD-ROM), optical storage device, magnetic storage device, or any suitable combination of the foregoing. For purposes of the present disclosure, a computer-readable storage medium may be any tangible medium that contains or stores a program that may be used by or in combination with an instruction execution system, apparatus, or component. And in the present disclosure, a computer-readable signal medium may comprise a data signal propagated in a baseband or as part of a carrier carrying computer-readable program code. Such propagated data signals may take a variety of forms, comprising electromagnetic signals, optical signals, or any suitable combination of the foregoing. The computer-readable signal medium may also be any computer-readable medium other than a computer-readable storage medium that sends, disseminates, or transmits a program for use by, or in conjunction with, an instruction-executing system, apparatus, or component. The program code contained on the computer-readable medium may be transmitted using any suitable medium, comprising: wire, fiber optic cable, radio frequency (RF), etc., or any suitable combination thereof.

In some implementations, clients, servers may communicate with any currently known or future developed network protocol such as HyperText Transfer Protocol (HTTP) and may be interconnected with any form or medium of digital data communication (e.g., a communications network). Examples of communication networks comprise Local Area Networks (LAN), Wide Area Networks (WAN), Internet (e.g., the Internet), and End-to-End Networks (e.g., ad hoc End-to-End Networks), as well as any currently known or future developed networks.

The computer-readable medium may be included in the above-mentioned electronic device 600; it may also exist separately and not be assembled into the electronic device 600.

The computer-readable medium stores one or more computer programs, and when the one or more programs are executed by a processing apparatus, the method is implemented: the computer-readable medium above carries one or more programs, and when the one or more programs are executed by the electronic device, causing the electronic device 600 to: computer program code for performing the operations of the present disclosure may be written in one or more programming languages, or combinations thereof, the programming languages comprising object-oriented programming languages, such as Java, Smalltalk, C++, conventional procedural programming languages such as the "C" language, or similar programming languages, or similar programming languages. The program code may be executed entirely on the user's computer, partially on the user's computer, as a separate software package, partially on the user's computer and partially on a remote computer, or entirely on a remote computer or server. In the case of a remote computer, the remote computer may be connected to the user's computer over any kind of network, including a LAN or WAN, or it may be connected to an external computer (e.g., via an Internet connection using an Internet service provider).

The flowcharts and block diagrams in the accompanying drawings illustrate the architecture, functionality, and operation of systems, methods, and computer program products that may be implemented in accordance with various embodiments of the present disclosure. At this point, respective box in the flowcharts or block diagrams may represent a module, program segment, or portion of code that contains one or more executable instructions for implementing a specified logical function. It should also be noted that in some implementations that are determined to be substitutions, the functions indicated in the boxes may also occur in a different order than that indicated in the accompanying drawings. For example, two consecutively represented boxes may actually be executed substantially in parallel, and they may sometimes be executed in reverse order, depending on the function involved. It should also be noted that respective of the boxes in the block diagrams and I or flowcharts, as well as combinations of the boxes in the block diagrams and I or flowcharts, may be implemented in a dedicated hardware-based system that performs the specified function or operation, or may be implemented in a combination of dedicated hardware and computer instructions.

Units described as being involved in embodiments of the present disclosure may be implemented by way of software or may be implemented by way of hardware. Wherein the name of a unit does not in some cases constitute a limitation of the unit itself, for example, a first obtaining unit may also be described as "a unit for obtaining at least two Internet Protocol addresses".

The functions described above herein may be performed, at least in part, by one or more hardware logic components. For example, exemplary types of hardware logic components that may be used include: Field Programmable Gate Array (FPGA), Application Specific Integrated Circuit (ASIC), Application Specific Standard Parts (ASSP), System on Chip (SOC), and System on Chip (SOC). Application Specific Standard Parts (ASSP), System on Chip (SOC), Complex Programmable Logic Device (CPLD) and so on.

In the context of the present disclosure, a machine-readable medium may be a tangible medium that may include or store a program for use by or in conjunction with an instruction execution system, device, or apparatus. The machine-readable medium may be a machine-readable signal medium or a machine-readable storage medium. The machine-readable medium may comprise an electronic, magnetic, optical, electromagnetic, infrared, or semiconductor system, device, or apparatus, or any suitable combination thereof. Machine-readable storage media may comprise an electrical connection According to one or more wires, a portable computer disk, a hard disk, a random access memory (RAM), a read-only memory (ROM), an erasable programmable read-only memory (EPROM or flash memory), a fiber optic, a compact disk-read-only memory (CD-ROM) for convenience, an optical storage device, a magnetic storage device, or any suitable combination of the foregoing, or any suitable combination thereof.

According to one or more embodiments of the present disclosure, Example 1 provides a method for presenting, comprising:

determining operation information of a user from a video, the operation information comprising a motion trajectory of a hand of the user in the video;

generating a profile of an object based on the motion trajectory;

searching for corresponding information that matches the profile in a database; and presenting an image based on the corresponding information.

According to one or more embodiments of the present disclosure, Example 2 according to the method described in Example 1, the collecting operation information of a user comprises:

collecting, by an image collecting device, a plurality of frames of images of the display process;

performing semantic partitioning on the plurality of frames of images to extract a hand region in the plurality of frames of images; and generating the motion trajectory based on the hand region in the plurality of frames of images.

According to one or more embodiments of the present disclosure, Example 3 according to the method described in Example 1, searching for corresponding information that matches the profile in a predetermined database comprises:

determining a template object associated with the profile by a generative adversarial network (GAN); and searching for corresponding information of the template object in the predetermined database.

According to one or more embodiments of the present disclosure, Example 4 according to the method described in Example 2, The method further comprises:

performing semantic partitioning on the plurality of frames of images to extract a non-hand region in the plurality of frames of images; and correcting the motion trajectory based on the non-hand region in the plurality of frames of images.

According to one or more embodiments of the present disclosure, Example 5 according to the method described in Example 2, The method further comprises:

recognizing, based on the hand region in the plurality of frames of images, at least one of a hand posture and a hand-held object; and determining a category of the object based on the at least one of the hand postures and the hand-held object.

According to one or more embodiments of the present disclosure, Example 6 according to the method described in Example 1, before searching for corresponding information that matches the profile in a predetermined database, further comprises:

recognizing a keyword from a speech stream of the user by an automatic speech recognition (ASR) model; and determining a category of the object based on the keyword.

According to one or more embodiments of the present disclosure, Example 7 according to the method described in Example 5 or 6, searching for corresponding information that matches the profile in a predetermined database comprises:

filtering corresponding information of a template object that is consistent with the category from the predetermined database; and searching for the corresponding information that matches the profile from the corresponding information of the template object that is consistent with the category.

According to one or more embodiments of the present disclosure, Example 8 according to the method described in Example 6, recognizing a keyword from a speech stream of the user by an ASR model comprises:

segmenting the speech stream to obtain segments of the speech stream, and storing the segments of the speech stream in a buffer;

recognizing keywords from respective ones of the segments by the ASR model, and determining confidences of the keywords; and determining a keyword with a highest confidence as the keyword in the speech stream.

According to one or more embodiments of the present disclosure, Example 9 according to the method described in Example 1, the collecting operation information of a user comprises:

collecting, by a real-time communication (RTC) module, an audio frame, and a video frame of the display process; and transmitting, with a callback function, the video frame and the audio frame to an ASR module and a visual special effect module through a RTC channel.

According to one or more embodiments of the present disclosure, Example 10 according to the method described in Example 9, after generating an image based on the corresponding information further comprises:

performing traffic pushing, by Aiortc, on the image to a target device.

According to one or more embodiments of the present disclosure, Example 11 according to the method described in Example 1, the corresponding information comprises rendering information of the display object; and generating an image based on the corresponding information, comprises:

rendering the profile based on the rendering information to obtain the image.

According to one or more embodiments of the present disclosure, Example 12 according to the method described in Example 1, the image comprises a template object and explanation information of the template object; and after generating an image based on the corresponding information, the method further comprises:

displaying the template object in a first region and displaying the explanation information in a second region.

According to one or more embodiments of the present disclosure, Example 13 provides an apparatus for presenting, comprising:

a determination module configured to determine operation information of a user from a video, the operation information comprising a motion trajectory of a hand of the user in the video;

a profile generation module configured to generate a profile of an object based on the motion trajectory;

a matching module configured to search for corresponding information that matches the profile in a database; and a presenting module configured to present an image based on the corresponding information.

According to one or more embodiments of the present disclosure, Example 14 provides an electronic device comprising:

a processor; and a storage device storing a program, wherein the program, when executed by the processor, causes the processor to perform the method for presenting according to any one of Examples 1-12.

According to one or more embodiments of the present disclosure. Example 15 provides a computer-readable storage medium having a computer program thereon, the computer program, when executed by a processor, causing the method for presenting according to any of Examples 1-12 method for presenting.

I claim:

1. A method for presenting, comprising:

determining operation information of a user from a video, the operation information comprising a motion trajectory of a hand of the user in the video;

generating a profile of an object based on the motion trajectory;

searching for corresponding information that matches the profile in a database; and presenting an image based on the corresponding information, wherein the determining operation information of a user comprises:

collecting a plurality of frames of images in the video;

performing semantic partitioning on the plurality of frames of images to extract a hand region in the plurality of frames of images;

generating the motion trajectory based on the hand region in the plurality of frames of images;

performing semantic partitioning on the plurality of frames of images to extract a non-hand region in the plurality of frames of images; and correcting the motion trajectory based on the non-hand region in the plurality of frames of images.

2. The method of claim 1, wherein searching for corresponding information that matches the profile in a predetermined database comprises:

determining a template object associated with the profile by a generative adversarial network (GAN); and searching for corresponding information of the template object in the predetermined database.

3. The method of claim 1, further comprising:

performing semantic partitioning on the plurality of frames of images to extract a non-hand region in the plurality of frames of images; and correcting the motion trajectory based on the non-hand region in the plurality of frames of images.

4. The method of claim 1, further comprising:

recognizing, based on the hand region in the plurality of frames of images, at least one of a hand posture and a hand-held object; and determining a category of the object based on the at least one of the hand postures and the hand-held object.

5. The method of claim 1, before searching for corresponding information that matches the profile in a predetermined database, the method further comprising:

recognizing a keyword from a speech stream of the user by an automatic speech recognition (ASR) model; and determining a category of the object based on the keyword.

6. The method of claim 4, wherein the searching for corresponding information that matches the profile in a predetermined database comprises:

filtering corresponding information of a template object that is consistent with the category from the predetermined database; and searching for the corresponding information that matches the profile from the corresponding information of the template object that is consistent with the category.

7. The method of claim 5, wherein the recognizing a keyword from a speech stream of the user by an ASR model comprises:

segmenting the speech stream to obtain segments of the speech stream, and storing the segments of the speech stream in a buffer;

recognizing keywords from respective ones of the segments by the ASR model, and determining confidences of the keywords; and determining a keyword with a highest confidence as the keyword in the speech stream.

8. The method of claim 1, wherein the determining operation information of a user comprises:

collecting, by a real-time communication (RTC) module, an audio frame, and a video frame of the display process; and transmitting, with a callback function, the video frame and the audio frame to an ASR module and a visual special effect module through a RTC channel.

9. The method of claim 1, after generating an image based on the corresponding information, the method further comprising:

performing traffic pushing, by Aiortc, on the image to a target device.

10. The method of claim 1, wherein the corresponding information comprises rendering information of the display object; and generating an image based on the corresponding information, comprises:

rendering the profile based on the rendering information to obtain the image.

11. The method of claim 1, wherein the image comprises a template object and explanation information of the template object; and after generating an image based on the corresponding information, the method further comprises:

displaying the template object in a first region and displaying the explanation information in a second region.

12. An electronic device, comprising:

a processor; and a storage device storing a program, wherein the program, when executed by the processor, causes the processor to perform the method for presenting comprising:

determining operation information of a user from a video, the operation information comprising a motion trajectory of a hand of the user in the video;

generating a profile of an object based on the motion trajectory;

searching for corresponding information that matches the profile in a database; and presenting an image based on the corresponding information, wherein the determining operation information of a user comprises:

collecting a plurality of frames of images in the video;

performing semantic partitioning on the plurality of frames of images to extract a hand region in the plurality of frames of images;

generating the motion trajectory based on the hand region in the plurality of frames of images;

performing semantic partitioning on the plurality of frames of images to extract a non-hand region in the plurality of frames of images; and correcting the motion trajectory based on the non-hand region in the plurality of frames of images.

13. A non-transitory computer-readable storage medium having a computer program thereon, the computer program, when executed by a processor, causing the method for presenting comprising:

determining operation information of a user from a video, the operation information comprising a motion trajectory of a hand of the user in the video;

generating a profile of an object based on the motion trajectory;

searching for corresponding information that matches the profile in a database; and presenting an image based on the corresponding information, wherein the determining operation information of a user comprises:

collecting a plurality of frames of images in the video;

performing semantic partitioning on the plurality of frames of images to extract a hand region in the plurality of frames of images;

generating the motion trajectory based on the hand region in the plurality of frames of images;

performing semantic partitioning on the plurality of frames of images to extract a non-hand region in the plurality of frames of images; and correcting the motion trajectory based on the non-hand region in the plurality of frames of images.

14. The electronic device of claim 12, wherein searching for corresponding information that matches the profile in a predetermined database comprises:

determining a template object associated with the profile by a generative adversarial network (GAN); and searching for corresponding information of the template object in the predetermined database.

15. The electronic device of claim 12, wherein the method further comprises:

performing semantic partitioning on the plurality of frames of images to extract a non-hand region in the plurality of frames of images; and correcting the motion trajectory based on the non-hand region in the plurality of frames of images.

16. The electronic device of claim 12, wherein the method further comprises:

recognizing, based on the hand region in the plurality of frames of images, at least one of a hand posture and a hand-held object; and determining a category of the object based on the at least one of the hand postures and the hand-held object.

17. The electronic device of claim 12, wherein the method further comprises, before searching for corresponding information that matches the profile in a predetermined database:

recognizing a keyword from a speech stream of the user by an automatic speech recognition (ASR) model; and determining a category of the object based on the keyword.

18. The electronic device of claim 16, wherein the searching for corresponding information that matches the profile in a predetermined database comprises:

filtering corresponding information of a template object that is consistent with the category from the predetermined database; and searching for the corresponding information that matches the profile from the corresponding information of the template object that is consistent with the category.

* * * * *